(12) United States Patent
Li et al.

(10) Patent No.: US 8,462,497 B2
(45) Date of Patent: Jun. 11, 2013

(54) COMPUTER SYSTEM

(75) Inventors: Yang Li, Shenzhen (CN); Xiao-Su Zhu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 13/176,316

(22) Filed: Jul. 5, 2011

(65) Prior Publication Data

US 2012/0106064 A1 May 3, 2012

(30) Foreign Application Priority Data

Oct. 29, 2010 (CN) .......................... 2010 1 0525407

(51) Int. Cl.
*H05K 7/20* (2006.01)
*H05K 7/00* (2006.01)
*G06F 1/16* (2006.01)

(52) U.S. Cl.
USPC ................. 361/679.49; 361/679.48; 361/690; 361/694; 361/695; 165/80.2; 165/104.33; 165/121; 165/122; 165/185; 454/184

(58) Field of Classification Search
USPC ............ 361/679.21, 679.32, 679.46–679.55, 361/688, 689–697, 700–715, 719–727; 165/80.2–80.5, 104.14, 104.26, 104.33, 121–127, 185; 174/16.3, 252; 312/223.1, 312/223.2, 236, 265; 454/184; 257/706–727
See application file for complete search history.

(56) References Cited

U.S. PATENT DOCUMENTS

| 6,130,820 | A  | * | 10/2000 | Konstad et al. | ............... | 361/695 |
| 7,061,760 | B2 | * | 6/2006 | Hornung et al. | ............... | 361/695 |
| 7,180,731 | B2 | * | 2/2007 | Titzler et al. | ............. | 361/679.22 |
| 7,394,653 | B2 | * | 7/2008 | Cheng et al. | ............. | 361/679.48 |
| 7,580,259 | B2 | * | 8/2009 | Hsiao | ............. | 361/695 |
| 7,679,913 | B2 | * | 3/2010 | Hsieh | ........................ | 361/704 |
| 8,248,780 | B2 | * | 8/2012 | Zheng et al. | ............. | 361/679.47 |
| 8,395,890 | B2 | * | 3/2013 | Hsieh et al. | ............. | 361/679.47 |
| 2010/0309624 | A1 | * | 12/2010 | Yeh et al. | ................ | 361/679.48 |
| 2011/0304976 | A1 | * | 12/2011 | Knopf et al. | ............. | 361/679.47 |

* cited by examiner

*Primary Examiner* — Michail V Datskovskiy
(74) *Attorney, Agent, or Firm* — Altis Law Group, Inc.

(57) ABSTRACT

A computer system includes a display, a computer case securing the display, a fan assembly and a cover. A motherboard is attached to the computer case. A chip, a heat dissipating device, and a system fan are located on the motherboard. The fan assembly includes a securing plate and a fan attached to the securing plate. The securing plate covers the plurality of the memory cards. The cover defines a plurality of air intakes and a plurality of air outlets. The plurality of air intakes, the fan, the heat dissipating device, the chip, the system fan and the plurality of air outlets together form an air path for moving air therethrough.

15 Claims, 3 Drawing Sheets

COMPUTER SYSTEM

BACKGROUND

1. Technical Field

The present disclosure relates to computer systems, more particularly to a computer system with a heat dissipating apparatus.

2. Description of Related Art

Heat dissipating devices perform the critical function of removing heat from a computer system. For example, a plurality of fans is provided to efficiently dissipate heat. Air is directed out of the computer system by the fan, for dissipating heat generated in the computer system. However, if the air flows in a disorderly manner in the computer system, heat dissipating efficiency of the computer system will decrease.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean at least one.

Figure 1:
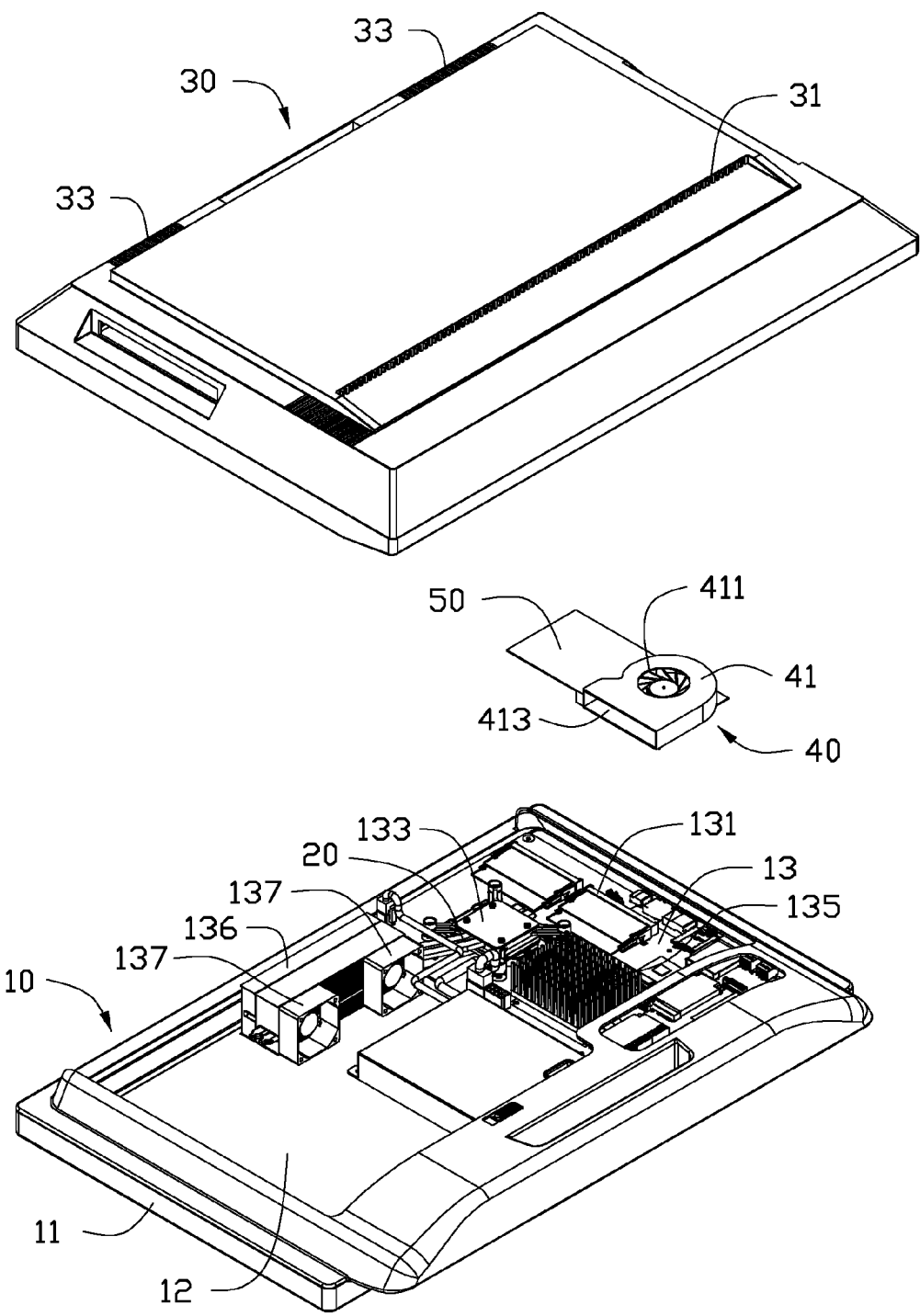
FIG. 1 is an exploded, isometric view of a computer system in accordance with an exemplary embodiment.
Figure 2:
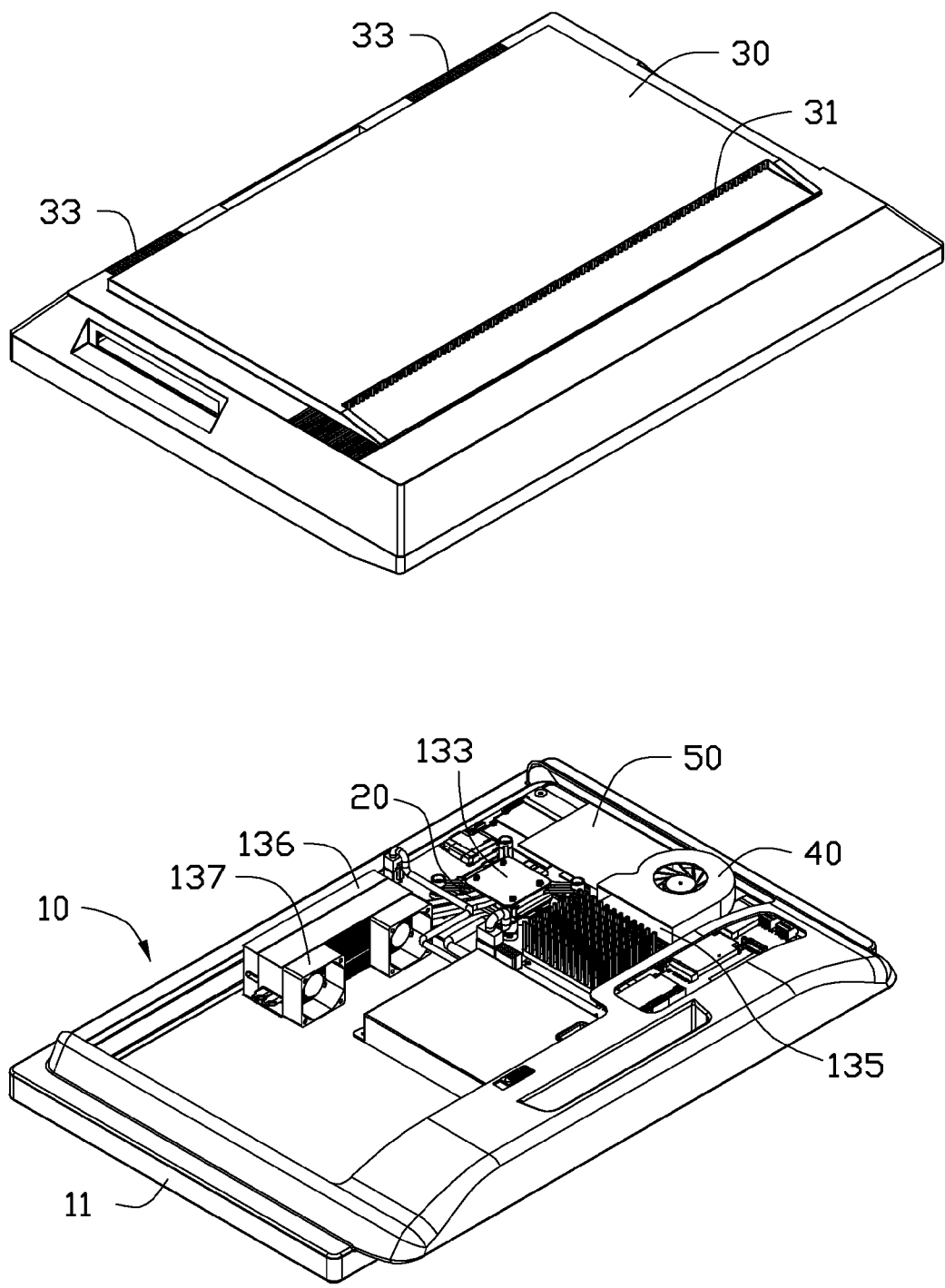
FIG. 2 is similar to FIG. 1, showing a fan assembly secured to a computer case.

Referring to FIGS. 1 and 2, a computer system in accordance with an exemplary embodiment includes a computer case 10 and a cover 30 attached to the computer case 10. In one exemplary embodiment, the computer system can be an all-in-one.

The computer case 10 can have various configurations, such as different wall or base configurations so long as the computer case 10 is adapted to couple with the cover 30 to create a housing 12.

A display 10 is secured to a first side of the computer case 10, and a motherboard 13 is attached to a second side of the computer case 10 opposite to the first side.

The motherboard 13 can also include various components that are typical of a computing device. For example, a plurality of memory cards 131 is mounted to the motherboard 13. A chip 133 and a heat dissipating device 135 are located at a side of the plurality of memory cards 131. A heat dissipating member 136, with two system fans 137 secured thereon, is attached to the motherboard 13. In one exemplary embodiment, the chip 133 and the heat dissipating device 135 are arranged in a first direction substantially parallel to a side plate 14 of the computer case 10, and the heat dissipating member 136 is arranged in a second direction substantially perpendicular to the first direction. A heat pipe 20 is located between the chip 133 and the heat dissipating member 136. In one exemplary embodiment, the plurality of memory cards 131 and the chip 133 generate heat, which can increase the temperature of the computer system.

A fan assembly 40, attached to the motherboard 13, includes a securing plate 50 and a fan 41 mounted to the securing plate 50. The fan 41 includes a first ventilation hole 411 defined in a top and a second ventilation hole 413 defined in a side. The securing plate 50 defines a through hole (not shown) communicating with a space (not labeled) of the fan 41. In one exemplary embodiment, the fan 41 is a centrifugal fan.

The cover 30 defines a plurality of air intakes 31 and a plurality of air outlets 33.

Figure 3:
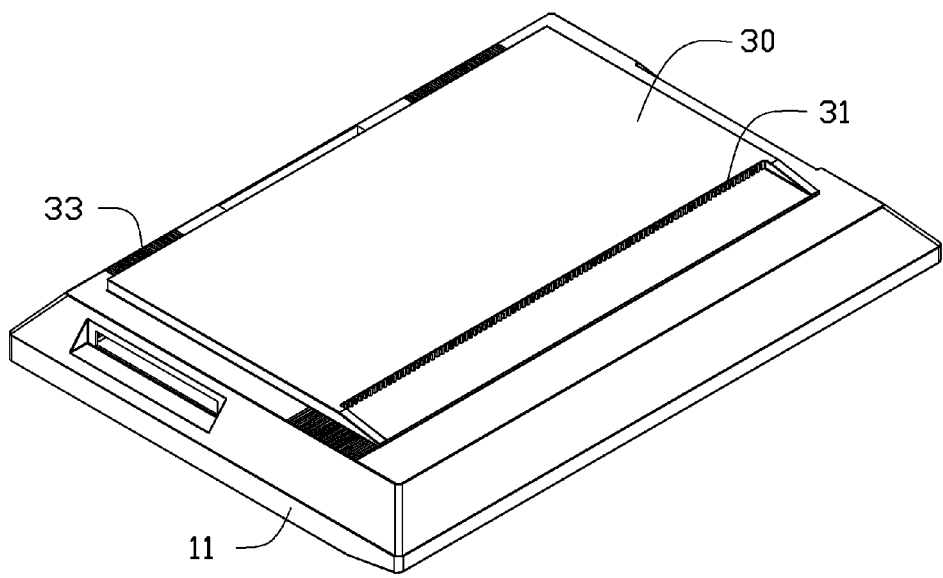
FIG. 3 is an assembled view of FIG. 1.

Referring to FIG. 3, in assembly, the fan assembly 40 is secured to the motherboard 13 on the plurality of memory cards 131 with fasteners. The fasteners can take the form of a screw with an associated washer or other appropriate means for coupling one element to another element. The second ventilation hole 413 faces the heat dissipating device 135. In one exemplary embodiment, a length of the second ventilation hole 413 allows air from the second ventilation hole 413 to substantially flow through the fins of the heat dissipating device 135 with high efficiency. The cover 30 is secured to the computer case 11 by conventional methods, such as screws.

In use, the plurality of memory cards 131 and the chip 133 generate heat. The heat is removed from the plurality of memory cards 131 by the fan 40. The heat from the chip 133 is transferred to the heat dissipating member 136 by the heat pipe 20 and removed from the heat dissipating member 136 by the two system fans 137. Air from the outside of the computer case 11 flows into the housing 12 via the plurality of air intakes 31, through the fan 40, the heat dissipating device 135 and the two system fans 137, and then out of the housing 12 via the plurality of air outlets 33 of the cover 30. With the heat pipe 20, the fan 40 and the two system fans 137, the heat generated from the plurality of memory cards 131 and the chip 133 can be effectively removed.

It is to be understood, however, that even though numerous characteristics and advantages have been set forth in the foregoing description of exemplary embodiments, together with details of the structures and functions of the exemplary embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a display;
   a computer case mounting the display; a motherboard attached to the computer case; a chip, a heat dissipating device, a system fan and a plurality of memory cards located on the motherboard;
   a fan assembly comprising a securing plate and a fan attached to the securing plate; the securing plate covering on the plurality of the memory cards; and
   a cover defining a plurality of air intakes and a plurality of air outlets;
   wherein the plurality of air intakes, the fan, the heat dissipating device, the chip, the system fan and the plurality of air outlets together form an air path for moving air therethrough.

2. The computer system of claim 1, wherein a heat dissipating member is attached to the system fan and arranged in a first direction substantially parallel to a side plate of the computer case, and the chip and the heat dissipating device are arranged in a second direction substantially perpendicular to the first direction.

3. The computer system of claim 1, wherein a heat pipe is attached to the motherboard, and the heat pipe is located between the chip and the heat dissipating member.

4. The computer system of claim 1, wherein the chip is located between the system fan and the plurality of memory cards.

5. The computer system of claim 1, wherein the fan is located on a top surface of the securing plate, and the plurality of memory cards is located on a bottom surface of the securing plate.

6. The computer system of claim 1, wherein the fan comprises a first ventilation hole and a second ventilation hole, and the second ventilation hole corresponds to the heat dissipating device.

7. The computer system of claim 1, wherein the fan is a centrifugal fan.

8. A computer system comprising:
 a computer case; a motherboard attached to the computer case; a heat dissipating device, a system fan and a plurality of memory cards located on the motherboard;
 a fan assembly comprising a securing plate and a fan attached to the securing plate; the securing plate covering on the plurality of the memory cards, and the fan abutting the heat dissipating device; and
 a cover defining a plurality of air intakes and a plurality of air outlets; the plurality of air intakes is adapted for air into the inside of the computer case;
 wherein the heat dissipating device is located between the fan and the system fan, the fan is adapted to move air passed the plurality of the memory cards, the heat dissipating device and the system fan, and out of the computer case via the plurality of air outlets.

9. The computer system of claim 8, further comprising a display, the cover and the computer case defining a housing for receiving the heat dissipating device, the system fan, the fan assembly and the plurality of memory cards, wherein the display is located on a first side of the computer case, and the housing is located on an opposite side of the computer case.

10. The computer system of claim 8, wherein a heat dissipating member and a chip are attached to the motherboard, the heat dissipating member is attached to the system fan and arranged in a first direction substantially parallel to a side plate of the computer case, and the chip and the heat dissipating device are arranged in a second direction substantially perpendicular to the first direction.

11. The computer system of claim 10, wherein a heat pipe is attached to the motherboard, and the heat pipe is located between the chip and the heat dissipating member.

12. The computer system of claim 10, wherein the chip is located between the system fan and the plurality of memory cards.

13. The computer system of claim 8, wherein the fan is located on a top surface of the securing plate, and the plurality of memory cards is located on a bottom surface of the securing plate.

14. The computer system of claim 12, wherein the fan comprises a first ventilation hole and a second ventilation hole, and the second ventilation hole corresponds the heat dissipating device.

15. The computer system of claim 8, wherein the fan is a centrifugal fan.

* * * * *